United States Patent [19]

Chambers

[11] Patent Number: 4,466,161
[45] Date of Patent: Aug. 21, 1984

[54] MEANS AND METHOD FOR ADJUSTING AND CONNECTING CORDS

[75] Inventor: Benjamin C. Chambers, Littleton, Colo.

[73] Assignee: Martin Marietta Corporation, Bethesda, Md.

[21] Appl. No.: 426,538

[22] Filed: Sep. 29, 1982

[51] Int. Cl.³ .................. A43B 11/00; F16G 11/04
[52] U.S. Cl. .................. 24/115 R; 24/115 H; 24/DIG. 11
[58] Field of Search .......... 46/29, 27; 59/2; 63/2; 29/433; 24/DIG. 11, 304, 115 G, 115 H, 115 K, 115 L, 115 M, 115 N, 115 R

[56] References Cited

U.S. PATENT DOCUMENTS

| | | | |
|---|---|---|---|
| 1,113,371 | 10/1914 | Pajeau | 46/29 |
| 2,512,725 | 6/1950 | Mock, Jr. | 46/29 |
| 2,577,119 | 12/1951 | Fitzgerald | 46/29 |
| 2,838,756 | 6/1958 | Reinhard et al. | 343/912 |
| 3,107,439 | 10/1963 | Pan et al. | 46/29 |
| 3,220,152 | 11/1965 | Sturm | 46/29 |
| 3,653,098 | 4/1972 | Lagarde et al. | 24/114.5 |
| 3,845,575 | 11/1974 | Boden | 24/115 M |
| 3,879,780 | 4/1975 | Williams | 24/115 N |
| 4,077,697 | 3/1978 | Yates | 24/115 G |
| 4,273,537 | 6/1981 | Borisof | 434/83 |
| 4,308,906 | 1/1982 | Bula et al. | 24/115 G |
| 4,319,428 | 3/1982 | Fox | 24/115 H |

FOREIGN PATENT DOCUMENTS 295  3/1902  Sweden .................... 24/115 G

OTHER PUBLICATIONS

EPA, 0013, 693, 10/79, Dona et al.

Primary Examiner—George F. Lesmes
Assistant Examiner—Nancy A. B. Swisher
Attorney, Agent, or Firm—Patrick M. Hogan; Gay Chin; Phillip L. DeArment

[57] ABSTRACT

A bead for connecting cords. The bead includes holes therethrough through which the cords extend and adhesive in the holes for bonding the cords to the bead. A method is also described for adjusting the lengths of and connecting cords and includes the steps of fabricating a bead with holes, inserting cords through the holes, attaching a clamp to a cord whose length is to be adjusted, inserting shims between the bead and clamp so as to position the bead, introducing adhesive into the holes, and removing the clamp and shims.

10 Claims, 12 Drawing Figures

MEANS AND METHOD FOR ADJUSTING AND CONNECTING CORDS

BACKGROUND OF THE INVENTION

1. Field of the Invention

This invention relates to connectors and particularly to a new and improved means and method for connecting cords which also permits pre-adjustment of cord length.

2. Description of the Prior Art

The precision adjustment of the length of a cord followed by its secure attachment to another cord can be very important in many applications. For example, the curvature of an antenna surface must be accurately established so that the surface will properly reflect radio waves. Some antenna surfaces, such as those which are launched into space, are flexible so as to allow the antenna assembly to be folded and later deployed. One manner of pre-establishing the shape of such a flexible surface so that it will attain the proper curvature upon deployment is through the use of multiple tie cords which extend between the antenna surface and a network of draw cords running generally parallel to the antenna surface. The length of each of the tie cords must be adjusted, and often readjusted, relative to the lengths of the other tie cords until the proper antenna surface curvature is established. Their lengths having been determined, the tie cords are then connected to the draw cords.

Certain difficulties have been encountered, however, with previous methods used to adjust and connect the cords. For example, ball chain arrangements have been employed to permit length adjustment. Such arrangements, however, utilize a large number of parts and are therefore relatively expensive and heavy, payload weight being an important consideration when an antenna must be launched into space. Additionally, the ball-chain results in a rather coarse cord-length adjustment. Other types of arrangements, although they may be lighter and less expensive, often make cord length adjustment difficult resulting in frayed cords, or the adjustment mechanism may snag the antenna surface during antenna deployment.

In view of the above mentioned problems, it is therefore an object of the present invention to provide a simple and easy method for establishing and maintaining the shape of a flexible surface.

Another object of the present invention is to provide lightweight, relatively inexpensive means for adjusting the lengths of and connecting a plurality of cords.

Yet another object of the present invention is to provide cord adjustment and connection means which reduces fraying of the cords and snagging of the flexible surface.

SUMMARY OF THE INVENTION

The present invention, in accordance with one embodiment thereof, comprises means and a method for adjusting the lengths of and for connecting cords. The means for connecting cords comprises a bead having holes therethrough sized for receiving cords and adhesive disposed in the holes for bonding the cords to the bead. The method of connecting the cords comprises the steps of fabricating a bead with holes, inserting cords through the holes and introducing adhesive into the holes to bond the cords to the bead.

A particular form of the method of the invention includes additional steps prior to the bonding step for adjusting the length of cord on either side of the bead. The adjustment is accomplished by attaching clamping means to the cord and inserting shims between the clamping means and the bead to reposition the bead along the cord.

BRIEF DESCRIPTION OF THE DRAWING

This invention will be better understood from the following description taken in conjunction with the accompanying drawing, wherein.

DESCRIPTION OF THE PREFERRED EMBODIMENT

Figure 1:
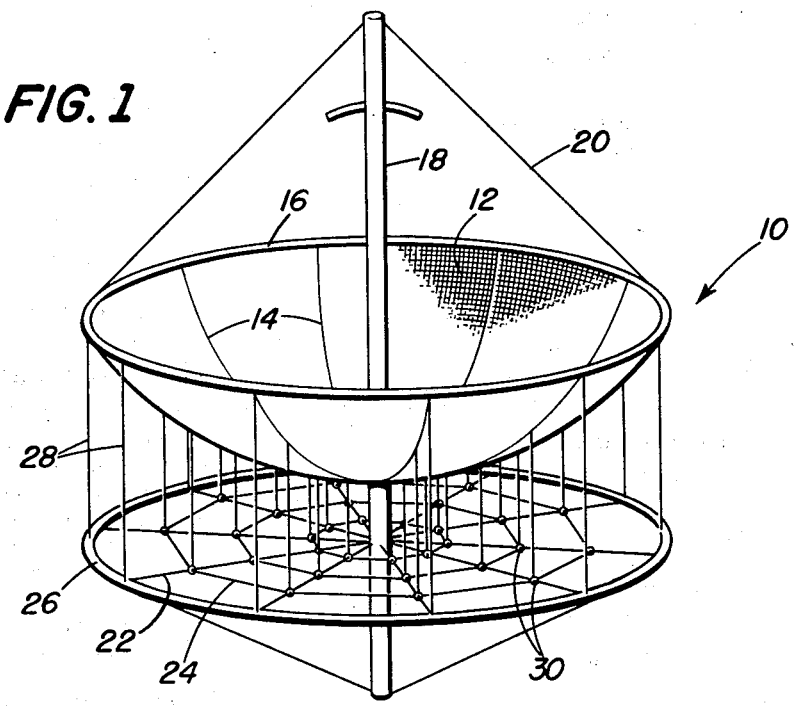
FIG. 1 is a view of an antenna system employing the connecting means of the present invention.

Turning now to a consideration of the drawing, and in particular to FIG. 1, there is shown a typical antenna system 10 incorporating the cord connecting means of the present invention. The antenna system 10 comprises a flexible antenna surface 12, only a portion of which is shown, including radial seams 14, an antenna surface support frame 16 which extends around the circumference of and provides support for the antenna surface 12, a mast 18 extending normal to the plane of the support frame 16, and guylines 20 between the support frame 16 and the mast 18.

Spaced beneath the antenna surface 12 is an assembly for establishing the shape of the antenna surface. The assembly includes a plurality of radial and circumferential draw cords 22 and 24, respectively, extending between structural members, such as a support hoop 26 and the mast 18, and generally parallel to the antenna surface 12 and to the plane of the support frame 16. Tie cords 28 are attached to the antenna surface 12 in any appropriate manner and extend to the draw cords 22 and 24. The present invention comprises means and a method for adjusting the length of and connecting the tie cords 28 to the draw cords 22 and 24 so as to adjust and maintain the shape of the antenna surface 12. Of course, the invention can be employed in many other applications and the description of its use in an antenna system is presented only as an example. In addition, it is intended that the term "cord" include within its meaning cables and any other type of flexible line or member.

Figure 2:
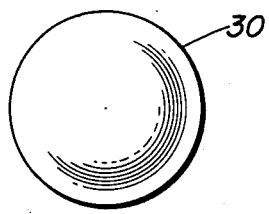
FIG. 2 is a view of a bead used to connect cords in the present invention.
Figure 3:
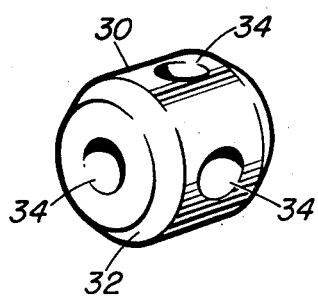
FIG. 3 shows an alternate shape for the bead.

The means for connecting each of the tie cords 28 to the draw cords 22 and 24 comprises a bead 30. Turning to FIG. 2, each bead 30 is preferably fabricated in a suitable manner such that it has a generally curved outer surface so as to avoid snagging other components of the antenna system 10, such as the antenna surface 12, particularly when the antenna system is deployable. Thus, the bead 30 can be fabricated in a spherical shape as shown in FIG. 2, or, as shown in FIG. 3, it could be sliced from cylindrical stock and then the edges 32 beveled. Of course, the bead 30 can be fabricated into any other shape as desired.

Each bead 30 can be fabricated from any material suitable to the environment to which it will be subjected. For example, when employed on an antenna system used in outer space, the bead 30 must be fabricated of a material which will maintain its integrity, strength and shape during the forces encountered in the launching and also in the vacuum of space. Suitable examples are fused quartz and certain injection molded plastics. Such a bead is lightweight and relatively inexpensive compared to previous connecting means.

Figure 2A:
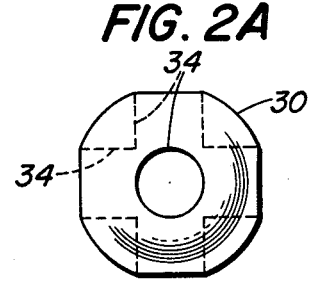
FIG. 2a is a view of the bead of FIG. 2 with holes drilled therethrough.

Each bead 30 includes a plurality of holes 34 extending therethrough sized for receiving cords. Although the bead 30 is shown in FIGS. 2a and 3 as having three holes therethrough aligned at right angles to each other, the number and the angles of the holes 34 will depend upon the number of cords which will be connected to the bead 30. The holes can be made through the bead 30 at the same time the bead is being fabricated, such as if the bead is molded, or the holes can be drilled, electro discharge machined (EDM) or otherwise made subsequent to the bead's fabrication.

Figure 4:
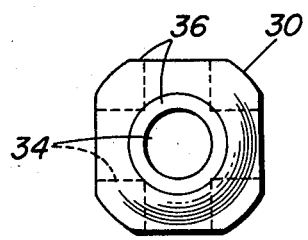
FIG. 4 is a view of the bead with portions of its surface flattened.
Figure 4A:
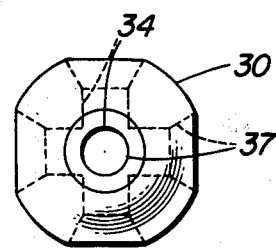
FIG. 4a is a view of the bead with the outer portions of its holes enlarged.

Turning to FIG. 4, in order to reduce fraying of the cords at the edges of the ends of the holes 34, the surface of the bead 30 adjacent each of the holes 34 can be flattened, as at 36. The flattening reduces the sharpness of the angle of the edge of the hole, thereby reducing fraying of the cords. Alternatively, the outer portion of each hole 34 can be enlarged, as at 37 in FIG. 4a, either during bead fabrication or in a subsequent step, such as by champfering or countersinking, so as to reduce the sharpness of the angle at the edge of the hole.

Figure 5:
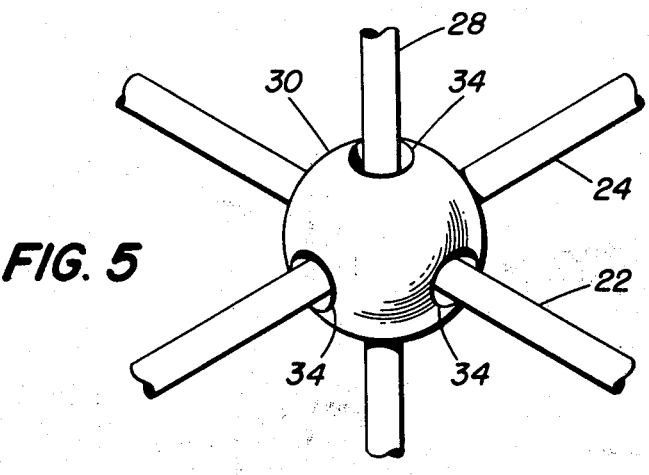
FIG. 5 shows cords inserted through holes in the bead.

Turning now to FIG. 5, a radial draw cord 22, a circumferential draw cord 24 and a tie cord 28 are shown as having been inserted through the holes 34 in a bead 30. The cords are now connected by introducing adhesive into the holes 34. The holes 34 should thus be slightly larger in diameter than the cord so as to provide adequate space for the adhesive to enter. The adhesive bonds the cords 22, 24 and 28 to the bead 30 thereby connecting the cords together. The adhesive employed should be compatible with the environmental conditions to which it will be subjected. An example of an adhesive suitable for most conditions is a "super glue" such as Eastman 910.

It may be desirable prior to introducing adhesive into the bead 30 to adjust one or more of the cords 22, 24 or 28 relative to the bead, thereby adjusting the length of the cord on either side of the bead. For instance, to modify the shape of the antenna surface 12 shown in FIG. 1, the lengths of the tie cords 28 are adjusted until the desired antenna surface shape is achieved. The method of adjusting cord length is as follows.

Figure 6:
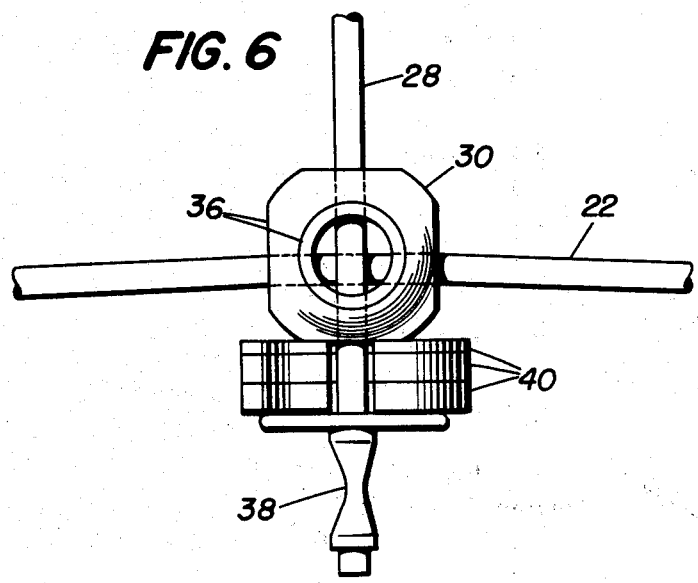
FIG. 6 shows clamping means and shims attached to a cord.

Referring to FIG. 6, clamping means, such as a crimp sleeve 38 or any other type of clamp which can be fixedly attached to a cord, is attached adjacent the bead 30 to each of the cords whose length on either side of the bead 30 is to be adjusted. In the example shown in FIG. 6, the length of the tie cord 28 above the bead 30 is to be shortened. The clamping means, or crimp sleeve 38, is attached to the tie cord 28 beneath the bead 30, that is, on the side of the bead opposite the portion of the cord which is to be shortened. Next, an appropriate number of shims 40 of desired thickness are inserted between the crimp sleeve 38 and the bead 30, thereby positioning the bead along the tie cord 28. As shims 40 are added or removed, the bead 30 is positioned further up or down relative to the tie cord 28, thus allowing simple and easy adjustment of the length of the tie cord above the bead. Simplicity of adjustment is particularly valuable when, as in the configuration of FIG. 1, many tie cords 28 are attached to a single surface, such as the antenna surface 12, and all the cords must be adjusted and readjusted numerous times in order to establish a desired shape for the surface. In addition, the choice of shim thicknesses permits accurate, fine adjustment of cord length.

Figure 7:
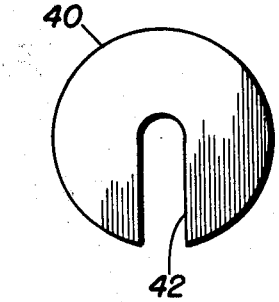
FIG. 7 shows a typical shim.

An example of a suitable shim 40 is shown in FIG. 7. The shim includes a cutout 42 allowing it to be easily inserted or removed from a cord. Returning to FIG. 6, the flattened portions 36 of the bead adjacent each of the holes 34 provides level surfaces against which the surface of a shim 40 can abut, thereby providing better cord length adjustment control.

After the length of a cord has been adjusted as desired, and while the clamping means and shims 38 remain in place, adhesive is introduced into the holes 34 of the bead 30. The adhesive bonds the bead 30 to the cords at the desired position along the cords, thereby establishing the lengths of the cords on either side of the bead.

Figure 8:
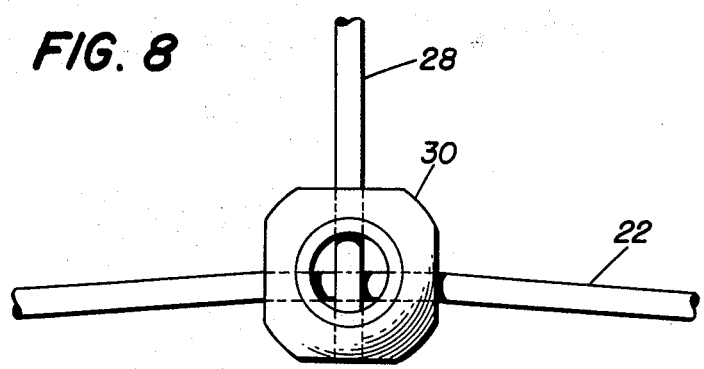
FIG. 8 shows the bead and cords connected together after the connecting means and shims have been removed.
Figure 9:
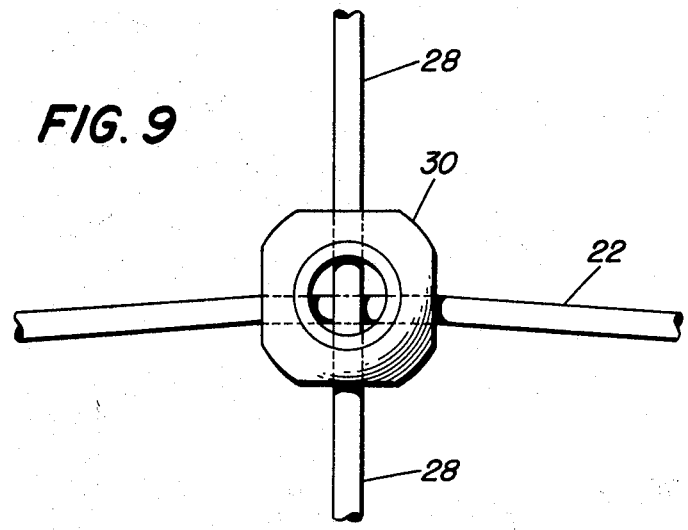
FIG. 9 shows another arrangement of cords connected to the bead.

The clamping means and the shims 40 are next removed from the cord. When the adjusted cord is to terminate at the bead 30, removal of the clamping means and shims can be accomplished by simply cutting the cord between the bead 30 and the shims 40, resulting in the arrangement shown in FIG. 8. Alternatively, when the adjusted cord is to continue to extend from both sides of the bead 30, as in FIG. 9, the clamping means is removed in some other manner so as not to damage the portion of the cord to which it is attached. The removal of the clamping means and shims provides a significant weight reduction to the antenna system 10, compared to previous adjusting and connecting arrangements where the adjusting components are retained on the system.

Figure 10:
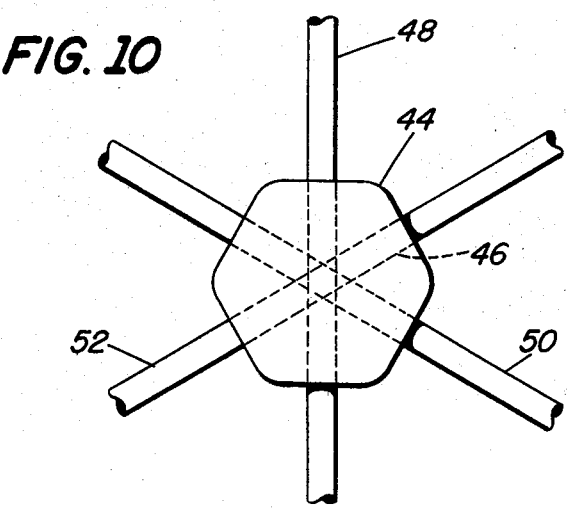
FIG. 10 shows an alternative configuration of the bead.

The particular configuration of the bead 30 can be varied without losing its effectiveness as a cord connecting and adjusting means. For example, FIG. 10 shows one of the many possible alternate configurations of a bead 44 wherein in the holes 46 therethrough are at other than right angles to each other. In this configuration, the lengths of the cords 48, 50 and 52 can be adjusted with clamping means and shims in the same manner as that described earlier and adhesive is introduced into the holes 46 to bond the bead and cords together as was also described earlier.

It is to be understood that this invention is not limited to the particular embodiments disclosed and it is intended to cover all modifications coming within the true spirit and scope of this invention as claimed.

What is claimed is:

1. Means for adjusting and connecting cords comprising:

(a) a bead having holes therethrough sized for receiving said cords;
(b) clamping means attached adjacent said bead to each of said cords whose length is to be adjusted;
(c) at least one shim disposed between each said clamping means and said bead for adjusting said length of said cords, said clamping means and said shims being removable; and
(d) adhesive disposed in said holes for bonding said bead to said cords.

2. The means of claim 1 wherein said bead has a flattened surface adjacent each of said holes.

3. The means of claim 1 wherein the outer portion of each of said holes is enlarged.

4. A method of adjusting the lengths of and connecting a plurality of cords comprising the steps of:
(a) fabricating a bead with a plurality of holes therethrough;
(b) inserting each of said cords through one of said holes in said bead;
(c) attaching clamping means adjacent said bead to each of said cords whose length on either side of said bead is to be adjusted;
(d) inserting shims between said clamping means and said bead thereby positioning said bead along said cord;
(e) introducing adhesive into said holes in said bead thereby bonding said cords to said bead; and
(f) removing said clamping means and said shims from said cord.

5. The method of claim 4 wherein said bead is fabricated in step (a) with a generally curved outer surface.

6. The method of claim 5 comprising an additional step between steps (a) and (b) of flattening the surface of said bead adjacent each of said holes.

7. The method of claim 4 wherein the outer portion of each of said holes fabricated in said bead is enlarged.

8. The method of claim 4 wherein said clamping means and said shims are removed from said cord in step (f) by cutting said cord between said bead and said shims.

9. The method of claim 4 wherein said clamping means comprises a crimp sleeve.

10. In an assembly including a flexible surface, a plurality of draw cords extending between structural members and generally parallel to said surface, and a plurality of tie cords attached to said surface and extending therefrom to said draw cords, a method of adjusting the lengths of said tie cords and of connecting said tie cords to said draw cords for thereby establishing the shape of said surface comprising the steps of:
(a) fabricating a plurality of beads, each of said beads having holes therethrough;
(b) inserting a tie cord and at least one draw cord through said holes in each of said beads;
(c) attaching clamping means adjacent said beads to each of said tie cords on the opposite side of said beads from said surface;
(d) inserting shims between said clamping means and said beads on each of said tie cords as necessary to position said beads along and thereby adjust the length of said tie cords to establish the shape of said surface;
(e) introducing adhesive into said holes in said beads thereby bonding said tie cords and said draw cords to said beads; and
(f) removing the excess of said tie cords by cutting said tie cords between said beads and said shims.

* * * * *